Aug. 7, 1923.

J. PETRY

DENTURE

Filed July 2, 1921

1,463,968

INVENTOR
Jacob Petry
By Kay, Totten & Brown,
Attorneys

Patented Aug. 7, 1923.

1,463,968

UNITED STATES PATENT OFFICE.

JACOB PETRY, OF PITTSBURGH, PENNSYLVANIA.

DENTURE.

Application filed July 2, 1921. Serial No. 482,190.

*To all whom it may concern:*

Be it known that I, JACOB PETRY, a citizen of the United States, and resident of Pittsburgh, in the county of Allegheny and State of Pennsylvania, have invented a new and useful Improvement in Dentures; and I do hereby declare the following to be a full, clear, and exact description thereof.

My invention relates to an improvement in dentures, the object of my invention being to construct a denture in which provision is made for securely retaining and holding a rubber plate with suction cups formed thereon, and at the same time to provide cups of such shape that they will readily adapt themselves to the ridge, whether it be wide or narrow, and so act to hold the denture securely in place in the mouth.

Figure 1:
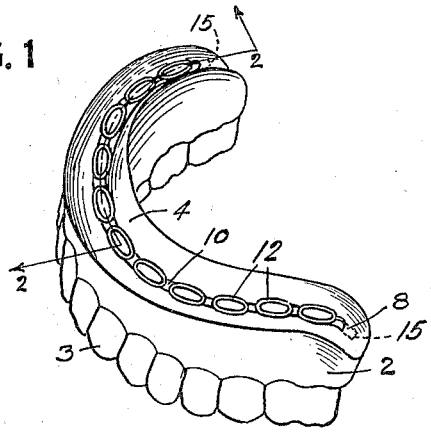
Figure 2:
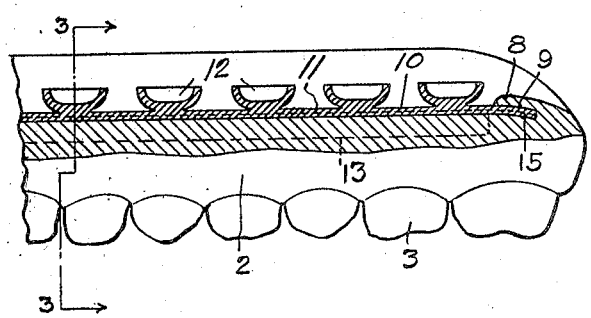
Figure 3:
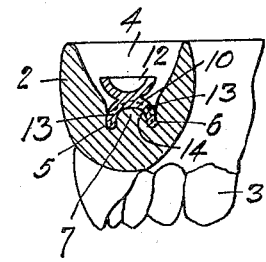

In the accompanying drawing, Fig. 1 is a perspective view of my improved denture; Fig. 2 is an enlarged section of a portion of the denture on the line 2—2, Fig. 1; Fig. 3 is a section on the line 3—3, Fig. 2; Figs. 4, 5, 6 and 7 show modified forms of my invention.

In the drawing the numeral 2 designates a suitable denture in which the teeth 3 are embedded in the usual manner. The denture is formed with the depression 4, and at the bottom of the depression 4 are the grooves 5 and 6 with the central rib portion 7 formed thereby. The depression 4 and the grooves 5 and 6 are formed by means of a suitable pattern, which may consist of two trough-shaped pieces of metal joined together along their outer curved sides. At the ends of the depression 4 are the enlargements 8, and formed in said enlargements are the recesses 9 which are formed in the denture when it is molded by the use of a suitable pattern-piece which also forms the grooves 5 and 6.

The suction plate 10 is made of rubber with a wire-mesh 11 embedded therein, so as to strengthen the rubber and at the same time give it the proper flexibility.

Formed integral with the rubber-plate 10 are the suction-cups 12.

The plate 10 is formed with the downwardly extending flanges or ribs 13 which are adapted to fit in the grooves 5 and 6, the groove 14 formed by said flanges receiving the rib 7 of the denture. At the ends of the plate 10 are the projections 15 which are tucked in the recesses 9 in the denture.

The plate 10 is inserted in the denture and is secured therein by cement or other suitable material, and due to the grooves 5 and 6 the plate has an interlocking engagement with the denture and is held securely therein, while the end portions 15 are held within the recesses 9, and in this way further provision is made for preventing the dislodgment of the plate.

Figure 5:
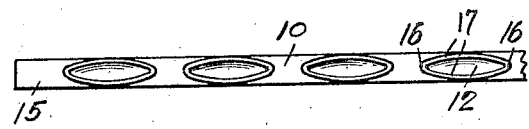
Figure 6:

The cups, as shown in Figs. 1, 2 and 3, are adapted for use in connection with a wide ridge, but in cases where a narrow ridge is to be suited the cups are made of the shape illustrated in Figs. 5 and 6. In this case the cups are elongated, and as shown in Fig. 6 are higher at the ends than at the mid-portion, so that when the plate is adjusted to the ridge it will first engage the end portions 16, and by pressing down on them the side portions 17 will move toward each other and will fit tightly against the ridge so as to act to hold the denture securely in place.

Figure 4:
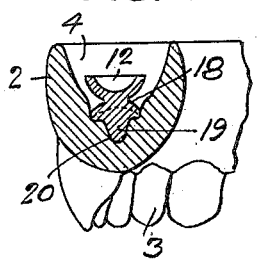

In Fig. 4 I have illustrated a modified form of my invention in which the plate 18 is formed with a rib 19 which engages the groove 20 in the denture, instead of employing the flanges 13 as above.

Figure 7:
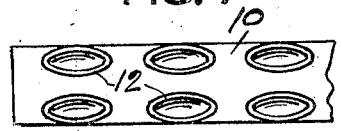

Instead of a single row of cups as shown in Figs. 1 to 6, two rows of cups may be provided, as shown in Fig. 7, one row being adapted to engage the lingual surface of the ridge, while the other or outer row engages the buccal surface of the ridge. My invention includes all such modifications as are included in the scope of the appended claims.

What I claim is:

1. In a denture having a depression formed therein, a rubber plate having suction-cups carried thereby in said depression, and having a longitudinally extending projection engaging a correspondingly shaped groove formed in said denture and cemented therein.

2. In a denture having a depression formed therein, a rubber plate secured in said depression, suction-cups carried by said plate, said suction-cups being elongated and having their end portions higher than the intermediate side portions.

In testimony whereof, I the said JACOB PETRY have hereunto set my hand.

JACOB PETRY.

Witnesses:
EDITH K. FREESE,
JOHN F. WILL.